United States Patent
McGrath et al.

(10) Patent No.: US 7,447,722 B2
(45) Date of Patent: Nov. 4, 2008

(54) LOW LATENCY COMPUTATION IN REAL TIME UTILIZING A DSP PROCESSOR

(75) Inventors: David S. McGrath, Rose Bay (AU); Andrew Peter Reilly, Hurlstone Park (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 780 days.

(21) Appl. No.: 10/492,801

(22) PCT Filed: Nov. 11, 2002

(86) PCT No.: PCT/AU02/01535

§ 371 (c)(1),
(2), (4) Date: Aug. 31, 2004

(87) PCT Pub. No.: WO03/042841

PCT Pub. Date: May 22, 2003

(65) Prior Publication Data

US 2005/0256915 A1    Nov. 17, 2005

(30) Foreign Application Priority Data

Nov. 12, 2001  (AU) .................................. PR8810

(51) Int. Cl.
*G06F 17/10*  (2006.01)

(52) U.S. Cl. ....................... 708/315; 708/300
(58) Field of Classification Search .......... 708/300–400
See application file for complete search history.

(56) References Cited

U.S. PATENT DOCUMENTS

| 4,207,624 | A | * | 6/1980 | Dentino et al. | 367/135 |
| 4,562,537 | A | | 12/1985 | Barnett et al. | 364/200 |
| 5,590,121 | A | * | 12/1996 | Geigel et al. | 370/290 |
| 5,978,509 | A | | 11/1999 | Nachtergaele et al. | 382/236 |
| 6,625,629 | B1 | | 9/2003 | Garcia | 708/315 |

FOREIGN PATENT DOCUMENTS

EP  0 260 837 B1  4/1995

* cited by examiner

*Primary Examiner*—Lewis A. Bullock, Jr.
*Assistant Examiner*—Michael Yaary
(74) *Attorney, Agent, or Firm*—Dov Rosenfeld; Inventek (57) ABSTRACT

A method for applying a computation utilizing a processor (112) capable of accessing an on-chip memory (114) and data from an off-chip source (116), the method comprising the iterative steps of retrieving at the on-chip memory (114) successive frames of input data from the off-chip source (116); computing from a current input frame of data (30) available in the on-chip memory current result elements for completing a current output frame of results (33, 34, 35), and pre-computing from the current frame of input data future result elements for contributing to at least one future output frame of results.

18 Claims, 6 Drawing Sheets

A) Frame i

Result buffer, 46 — Result 0 is ready for output

| 40 | Set full result | Update with 2 terms => full | Update with 1 term => full | Set full result | Update with 2 terms => full | Update with 1 term => full |
|---|---|---|---|---|---|---|
| 42 1 | Set partial, less one term | | Unchanged partial | Set partial, less one term | | Unchanged partial |
| 44 2 | Set partial, less two terms | | | Set partial, less two terms | | |

B) Frame i+1

Result buffer, 46 — Result 1 is ready for output

| 40 0 | Set partial, less two terms | | | Set partial, less two terms | | |
|---|---|---|---|---|---|---|
| 42 1 | Update 1 term => full | Set full result | Update 2 terms => full | Update 1 term => full | Set full result | Update 2 terms => full |
| 44 2 | Unchanged partial | Set partial, less one term | | Unchanged partial | Set partial, less one term | |

C) Frame i+2

Result buffer, 46 — Result 2 is ready for output

| 40 0 | | Unchanged partial | Set partial, less one term | | Unchanged partial | Set partial, less one term |
|---|---|---|---|---|---|---|
| 42 1 | | Set partial, less two terms | | | | Set partial, less two terms |
| 44 2 | Update 2 terms => full | Update 1 term => full | Set full result | Update 2 terms => full | Update 1 term => full | Set full result |

Bin 0            Bin N-1

LOW LATENCY COMPUTATION IN REAL TIME UTILIZING A DSP PROCESSOR

FIELD OF THE INVENTION

The present invention relates to high speed low latency computing using on and off-chip memory, and in particular low latency convolution of digital signals. In a preferred embodiment an efficient form of convolution suitable for use on a processor architecture that includes a limited quantity of memory with access time comparable to the processor cycle time and a main memory with an access rate significantly lower than the processor instruction execution rate is described.

BACKGROUND OF THE INVENTION

U.S. Pat. No. 5,502,747 entitled "Method and apparatus for filtering an electronic environment with improved accuracy and efficiency and short flow-through delay" filed by the present applicant, discloses a convolution filter having low latency and also having the ability to perform long convolutions.

Modern DSP algorithms are normally implemented on a digital signal processor such as the Motorola 56300 family, or (increasingly often) on general purpose microprocessors or custom or field-programmable integrated circuits (ASICs or FPGAs). Modern processor architectures normally have limited on-board memory resources and, as such, these resources must be managed efficiently, especially when off-chip memory access often incurs a relatively high overhead penalty, in that "wait states" are often incurred.

A wait-state is a processor state in which the processing element does nothing while it waits for a value to be read from or written to external memory. There may be more than one wait-state associated with each off-chip memory access. It is a characteristic of typical on-board memory systems that they induce fewer wait-states than off-chip memory, or none.

It would therefore be desirable to provide for an efficient form of convolution process which is amenable to a high speed implementation on such processor architectures.

SUMMARY OF THE INVENTION

It is an object of the present invention to provide for high speed, low latency computing which requires the usage of both on-chip memory and data from off-chip sources such as off-chip memory. In one version, the computation is in the form of a convolution which is implemented on DSP architecture. The computation is to be applied, repeatedly, to portions of data, in sequence. The advantageous nature of embodiments of the invention is apparent when succeeding portions of data are not available for processing until, or just before, the results that correspond to that data are required. This is commonly referred to as a "real-time" data processing system.

In accordance with a first aspect of the present invention there is provided a method for applying a computation utilising a processor capable of accessing an on-chip memory and data from an off-chip source, the method comprising the iterative steps of:

(a) retrieving at the on-chip memory successive frames of input data from the off-chip source;

(b) computing from a current input frame of data available in the on-chip memory current result elements for completing a current output frame of results, and (c) pre-computing from the current frame of input data future result elements for contributing to at least one future output frame of results.

Step (b) preferably comprises combining the computed current result elements with result elements pre-computed from at least one preceding frame of input data to complete the current output frame of results.

Advantageously, the future output frame of results requires at least one input data frame which has not yet been retrieved from the off-chip memory for completion.

In a preferred embodiment, the method comprises the step of breaking up an algorithm for computing from the current input frame of data the current result elements into different algorithm execution phases, and further comprising the iterative steps of:

computing from the current input frame of data the current result elements for completing the current output frame of results stored in a current result buffer by applying a different one of the algorithm execution phases to each of respective partitions of the current result buffer, pre-computing from the current frame of input data future result elements for contributing to at least one future output frame of results, and storing the future result elements in at least one future result buffer, the at least one future result buffer being partitioned in the same way as the current result buffer.

Each partition of the current result buffer preferably has a different one of the algorithm execution phases applied to it from one iteration to another, and such that all algorithm execution phases are applied to each partition before one of the algorithm execution phases is re-applied to that partition.

The algorithm execution phases preferably include a phase of setting all terms of the partition, and at least one phase of updating one term of the partition.

The algorithm execution phases may further include at least one phase of updating multiple terms of the partition.

In accordance with a second aspect of the present invention, there is provided a method for applying a computation that accesses more data than would fit into a high-speed on-chip memory of a digital signal processor, including the step of accessing successive frames of input data, wherein the average access speed of the data by the processor is between the on-chip memory access speed and the off-chip memory access speed, and wherein the inherent algorithmic or computational latency of each successive result is less than an average acquisition time of a single frame of input data.

Preferably, the method comprises the steps of computing current results using the data currently resident in the on-chip memory, and computing partial results for at least one successive future frame of results by using at least some of the same current data.

In the first or second aspects, the on-chip memory may include a set of constant coefficients associated with the computation.

In the first or second aspects, the method may be applied to a segmented impulse response frequency domain convolution algorithm computation.

In accordance with a third aspect of the present invention there is provided a system for applying a computation comprising means for retrieving at an on-chip memory successive frames of input data from an off-chip source; a processor arranged, in use, to compute from a current input frame of data available in the on-chip memory current result elements for completing a current output frame of results, and wherein the processor is further arranged, in use, to pre-compute from the current frame of input data future result elements for contributing to at least one future output frame of results.

Preferably, the processor is arranged to combine the computed current result elements with result elements pre-computed from at least one preceding frame of input data to complete the current output frame of results.

Advantageously, the future output frame of results requires at least one input data frame which has not yet been retrieved from the off-chip memory for completion.

In one preferred embodiment, the system is arranged such that, in use, an algorithm for computing from the current input frame of data the current result elements is broken up into different algorithm execution phases, and the processor is arranged, in use, to execute the iterative steps of computing from the current input frame of data the current result elements for completing the current output frame of results stored in a current result buffer by applying a different one of the algorithm execution phases to each of respective partitions of the current result buffer, pre-computing from the current frame of input data future result elements for contributing to at least one future output frame of results, and storing the future result elements in at least one future result buffer, the at least one future result buffer being partitioned in the same way as the current result buffer.

Preferably, the processor is arranged, in use, such that each partition of the current result buffer has a different one of the algorithm execution phases applied to it from one iteration to another, and such that all algorithm execution phases are applied to each partition before one of the algorithm execution phases is re-applied to that partition.

Advantageously, the algorithm execution phases include a phase of setting all terms of the partition, and at least one phase of updating one term of the partition.

The algorithm execution phases may further include at least one phase of updating multiple terms of the partition.

The system may further comprise one or more of a group of the on-chip memory, the of-chip source, and the current result buffer, and the at least one future result buffer.

In accordance with a fourth aspect of the present invention, there is provided a data storage medium having stored thereon computer readable data for instructing a computer to execute a method according to the first or second aspects.

The system may be arranged, in use, to execute a segmented impulse response frequency domain convolution algorithm computation.

BRIEF DESCRIPTION OF THE DRAWINGS

Notwithstanding any other forms which may fall within the scope of the present invention, preferred forms of the invention will now be described, by way of example only, with reference to the accompanying drawings in which.

DETAILED DESCRIPTION OF THE EMBODIMENTS

The various values used in the computation of preferred embodiments can be categorized into several distinct sorts, and making these distinctions will aid the explanation:

1. Input and output data: this is the signal to be processed, and the result of said processing. Input data is typically available in batches as the result of the transduction of some physical process, such as the vibrations of air pressure in the vicinity of a microphone. Output data is typically required immediately, for transduction to a physical process, such as the imparting of vibrations to air by a set of loudspeaker drivers. The number of discrete values available in the batches may be as few as one, but it is common to have sufficient temporal slack to be able to contrive for these values to be buffered into frames of some size, and we shall designate the number of "sample" periods that the data represents as "N".

2. Coefficients: these are the values that are consistent from the application of the computation to one frame of N sample values to the next. The coefficients can be thought of as part of the machinery of the computation, in that it is they, along with the program code that executes on the processor, that determine the specific function that is computed. On the other hand, they are also like input/output data and state, in that they are often stored in the same sort of memory, and therefore subject to the same wait-state constraints.

3. State values: these are values that depend on the history of previously-observed input data, and may consist merely of stored values of that older data, or may be some arbitrary function of that past input data. They many also be values that relate only to the machinery of the computation.

4. Temporaries values. Like state values, these are values that are either an internal mechanism of the computation or derived from the input data, in the process of computing the output data, but unlike state, these are not required to be maintained from one application of the computation to the next.

The total memory space occupied by buffers for the input and output data, the coefficients, the system state and the temporaries are referred to as the "memory footprint", and it is assumed for the purposes of this invention that this total space is significantly larger than the fast, on-board memory that is available to the processor.

Apart from the aforementioned patent, (U.S. Pat. No. 5,502,747), another prior-art technique is often referred to as "cache-blocking". The general idea of blocking is to get the information to a high-speed storage and use it multiple times so as to amortize the cost of moving the data. Cache blocking operates to change the order of computation of terms of an overall computation so that more than one operation can be performed on each value fetched from memory.

That way, the computations after the first do not suffer the wait-states associated with the data's previous location in off-board memory, and so the total number of wait-states required to execute the computation is reduced. It follows that a prerequisite for cache blocking is a computation that uses some of its data and state values more than once. The direct implementation of the method of U.S. Pat. No. 5,502,747 does not offer an opportunity to apply this technique, because each coefficient is used only once to produce each new frame of output. It can be seen that if the technique is applied to non-real-time data, where all of the input signal is available at once, then cache-blocking could be applied, as each coefficient is re-used for each frame of output.

In many computations, each frame of output also requires a state value that corresponds to M previous frames of input data, which is another avenue for re-use. It would be possible to arrange to compute several ("P") frames of output at once, on the basis of several (P) frames of input, and arrange the computations so that cache-blocking was effected, and the number of wait-states required to access the coefficients and the state could be reduced by as much as a factor of P. However, this suffers a latency increase associated with the processing of P frames at once.

The invention described herein is a way of achieving a measure of cache-blocking as described in the previous paragraph, while not suffering the latency increase that operating on P frames of data at once would require. It is therefore applicable to realtime operation.

The preferred embodiment relies upon a modified form of algorithm which is similar to that disclosed in detail in the aforementioned specification of U.S. Pat. No. 5,502,747, the contents of which are hereby specifically incorporated by cross-reference.

Figure 1:
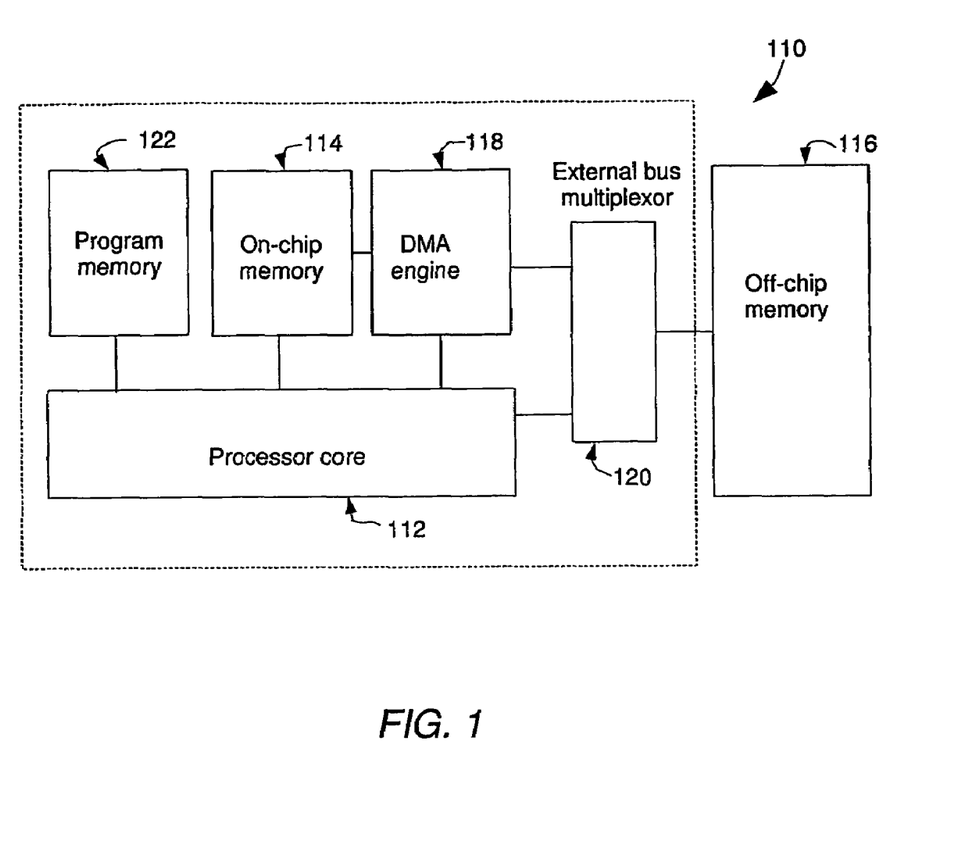
FIG. 1 illustrates one form of standard DSP architecture suitable for utilization with the algorithm of the preferred embodiment.

Turning first to FIG. 1, the method of the preferred embodiment operates on computing hardware that includes a DSP 110 having a processing element or core 112 that can perform both a memory fetch and a multiply-accumulate instruction in one processor clock cycle. A closely coupled "on-chip" 6144 (6 k), 24 bit words memory 114 introduces no wait-states and an "off-chip" static RAM 262144-word (256 k-word) memory 116 that introduces "W" wait-states for each access. A Direct Memory Access (DMA) engine 118 transfers data from the off-chip memory 116 to the on-chip memory 114 in P=W+2 processor cycles per word without interfering with the concurrent operation of the processor, via an external multiplexer bus 120.

Figure 2:
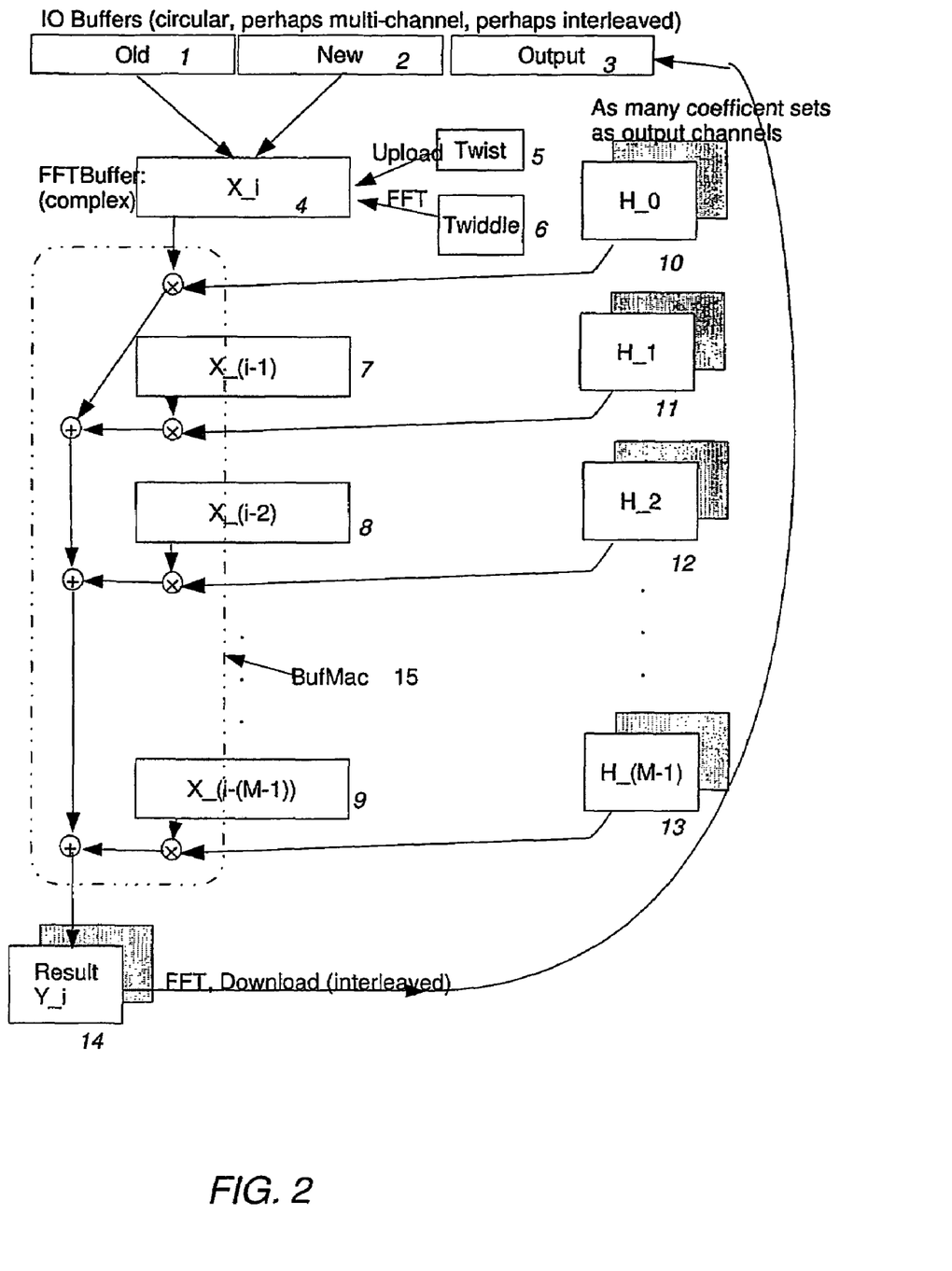
FIG. 2 illustrates the basic segmented low-latency convolution algorithm described in U.S. Pat. No. 5,502,747.

In addition, all of the requirements and software are provided for the original implementation of the algorithm disclosed in the aforementioned US patent, hereinafter known as the Low Latency Convolution algorithm. Specifically, the steps from the original algorithm comprising:

1. Acquire one block of N samples of input data for one channel, $x_i$. (Item 2 in FIG. 2.)
2. Form $x=x_{i-1}+j x_i$, where $x_{i-1}$ is the input data acquired in the previous time frame (item 1 in FIG. 2).
3. Compute $X_i=FFT(diag(w_{twist}).x)$ (item 4 in FIG. A1), where $w_{twist}$ are the "twist" factors, (item 5 in FIG. 2)
4. Compute Y=BufMac(X, H) where H are the coefficients for output Y, for each output, (dotted-region in FIG. 2). That is:

$$Y[k] = \sum_{j=0}^{M-1} X_{i-j}[k]H_j[k]$$

for all k indices of elements of Y, Xi and Hj, usually i in [0, N−1].

5. Repeat steps 1 to 4 for each input channel, accumulating the results for each output channel into a single result Y for each output channel. (only one input channel shown as such in FIG. 2)
6. Compute $y=imag(diag(w_{twist})'. FFT(Y)')$ for each output channel, and send these values to the output mechanism. (arc connecting 14 and 3 in FIG. 2)

Returning to FIG. 1, the on-chip memory 114 need only be large enough to hold the following:

2N complex words of data, being only necessary pre- or postmultiplication factors and the Fast Fourier Transform (FFT) buffer used to implement the original algorithm. That is, x and X in one block of N complex values, $w_{twist}$ and the FFT twiddle factors in blocks of N/2 complex values each; (items 4, 5 and 6 in FIG. 2)

4M(1+n OUT) complex words of data, arranged as two equal blocks with alignment such that modulo-2M addressing modes work for the first 2M words of each block. The blocks are further arranged so that a DMA engine can write to one block whilst the processor reads from the other without causing any memory access contention delays for either. "$n_{OUT}$" is the number of separate coefficient vectors that are to be convolved with the input stream to produce concurrently a corresponding number of resulting output signals.

Figure 3:
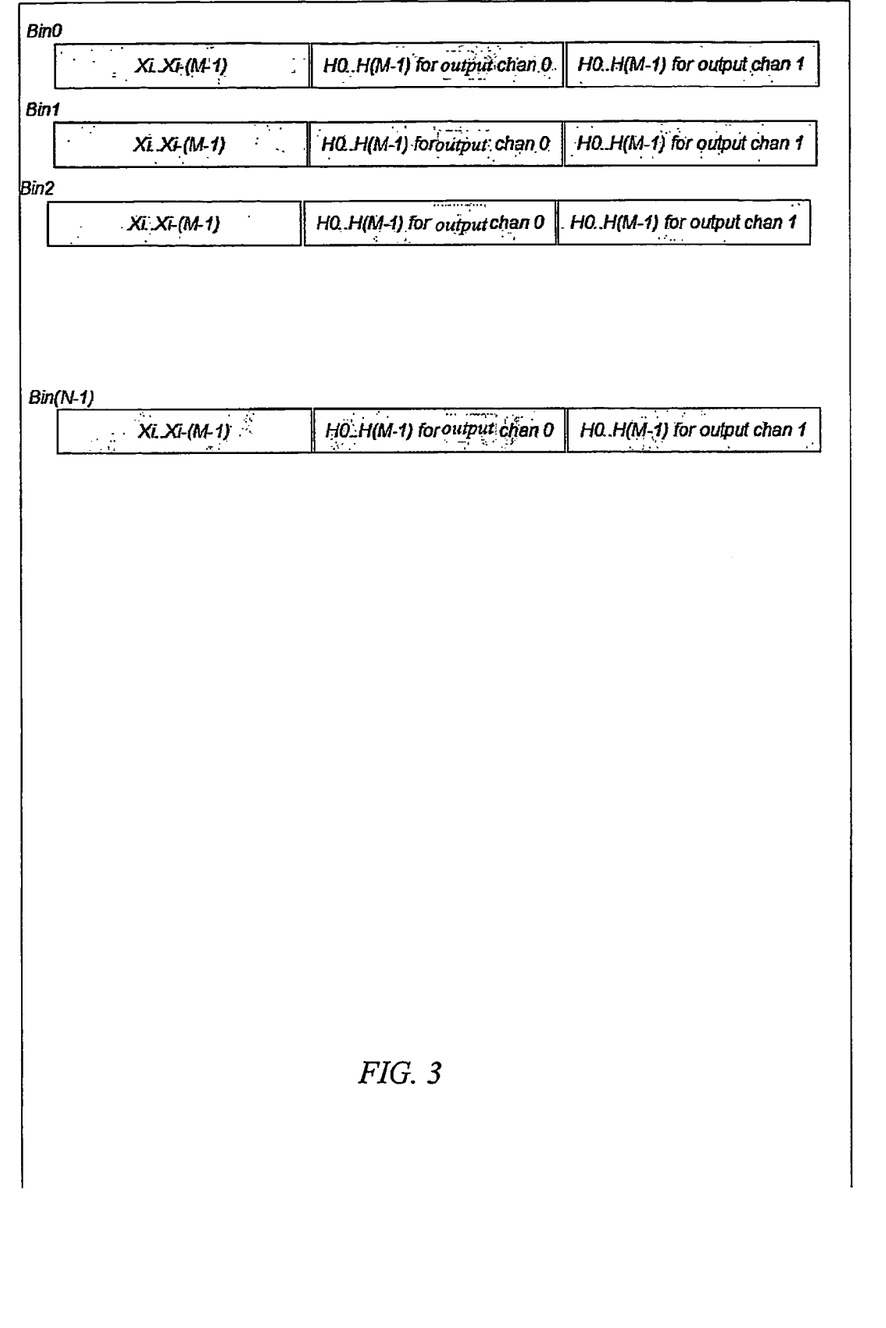
FIG. 3 illustrates the memory layout for the delay-line data and coefficients.

For example, with M=12, (corresponding to a BufMac operation that computes one block of output on the basis of the current and eleven saved blocks of input, and twelve blocks of coefficients, and $n_{OUT}$=2 for (say) left and right speaker outputs, we have twelve data values and 24 coefficient values, all complex, to compute output for a single frequency bin. That is storage for 72 words, with a modulo-2 addressing alignment requirement of 24-word alignment, which is achieved by starting the block at a multiple-of-32 address. We use two such blocks for the DMA double-buffering operation. If we use a Motorola DSP56300-series processor, on-chip memory is divided into 256-word chunks by the bus arbitration mechanism, so we must ensure that each of our two 72-word blocks lie entirely in separate 256-word pages, so that the central processor and the DMA engine do not contend for access to these memories;

The arrangement of data and coefficients in memory in one embodiment is illustrated in FIG. 3, for ease of access in inner loop of BufMac algorithm.

It is also possible to interleave the coefficients H for each output channel, if the processor has sufficient accumulator resources to compute multiple result complex dot-products at the same time. It may also be desirable to store the delay line data X in a disjoint memory space from H, so that the delay-line can be implemented as a (or several) circular buffer(s), thus avoiding the many write operations required to implement the delay lines in-place. It is also possible to not store the Xi values until performing the delay operation, because these will be present in the FFT buffer at the time that BufMac is executed.

Approximately 200 words of working storage for the algorithm;

The program, which may be stored in a separate program memory 122.

In the original algorithm, the IO buffers (items 1, 2, 3 in FIG. 2), result buffer (item 14) and BufMac structure (item 15) are typically stored off-chip. The present invention, in at least preferred embodiments, seeks to optimise the access to the BufMac structure, which can contain significant amounts of data as outlined above and thus cause significant delays in the original algorithm.

The following terms are utilized in the preferred embodiment, with reference again to FIG. 2 for illustration of the overall process.

FFT Buffer represents the storage of N complex words (i.e. 2N words) used as working storage by the computation of the algorithm. Item 4 in FIG. 2. That will hold the N new data values and the N old data values, the result of the twist multiplication, which can be performed in-place, and the argument and result of the FFT operation, which can also be performed in-place.

N represents the number of new samples consumed by the overlap-save filtering algorithm. It also denotes the size (number of complex input and output values) of the Fast Fourier Transform (FFT) and Inverse Fast Fourier Transform (IFFT) performed by the algorithm, as well as the computation latency of the algorithm. It is a fundamental parameter of the overlap-save filtering algorithm described in the six numbered steps above.

M represents the number of terms of the frequency-domain FIR algorithm that comprises the central portion of the Low-Latency convolution algorithm (also known as the BufMac kernel). This is the number of X blocks (and H blocks for each channel) shown in FIG. 2 as 4, 7, 8, 9 and 10, 11, 12, 13 respectively.

P represents the ratio between the rate at which the DMA engine can copy values from off-chip memory to on-chip memory and the rate at which the processor can consume these values while computing a complex multiply-accumulate loop (generally one per instruction cycle). This is the number of times off-chip data has to be used each time it is fetched from off-chip memory. In contemporary high performance processor hardware, P has a value in the range 2 to on the order of 10. It is easily possible (though not desirable) to arrange for the memory system to be even slower, with respect to the processor, resulting in a P value much larger than 10.

IO Buffer(s) These are the time-domain (circular) buffers used to pass signal data to and from the analog section (CO-DECs). It does not play a significant role in this description, but is part of the underlying Low Latency Convolution algorithm. Shown in FIG. 2 as blocks 1, 2, and 3.

Result Buffer(s) These are frequency domain buffers used to store complete and partial results of the algorithm described here. Storage is required for P times $n_{OUT}$ blocks of N complex words. This storage may be off-chip because of space constraints a situation similar to the one for the original algorithm. Shown in FIG. 2 as block 14.

Frequency domain delay line and coefficient (BufMac) data structure This is an array of blocks of memory (shown as blocks 7 to 13 in FIG. 2) that are used to store the time series of frequency-domain signal data and filter coefficients. For each of N frequency bins, there are $(1+n_{OUT})$ blocks of M complex values. The factor $(1+n_{OUT})$ provides for a block for the signal data and $n_{OUT}$ blocks for the (multiple) sets of filter coefficients. This arrangement is used so that memory access during the "BufMac" processing is essentially linear, which maximizes the performance of off-chip memory for most practical memory system designs. Shown for $n_{OUT}=2$ in FIG. 3.

Processing Steps This process is repeated for every N input samples, and produces $n_{OUT}$ streams of N output samples corresponding to the convolution of the preceding N by M input samples with the same number of coefficients. Coefficients are loaded into the BufMac data structure using a separate process described below. The process includes the following steps:

(a) Upload This is identical to the original Low-Latency Convolution algorithm. The last N signal samples read by the previous Upload pass and the next N signal samples are simultaneously read from the IO Buffer and multiplied as the real and imaginary parts (respectively) point-for-point with any premultiplication factors. The N resulting complex values are stored in the FFT Buffer.

(b) Fourier Transform The contents of the FFT Buffer are processed in-place by a Fast Fourier Transform routine, which replaces the pre-multiplied signal data with a frequency-domain signal representation.

(c) Segmented impulse response frequency domain convolution step (BufMac) This is the process of accumulating the complex products of each frequency bin of the signal with the corresponding bin of coefficients, for each time lag in [0, (M−1)], and it is described more fully below. Unlike the previous algorithm, this process leaves $n_{OUT}$ sets of results in one of the P sets of Result buffers. The Result buffer used is the one after the one used on the previous iteration (modulo P).

(d) Inverse Fourier Transform Each of the "current" $n_{OUT}$ Result buffers is copied into the FFTBuffer, where an inverse Fourier Transform operation is performed on it, to transform it into a time domain representation.

(e) Download After each of the $n_{OUT}$ signals are transformed (in the previous step), they are multiplied point-by-point with any post-multiplication. The imaginary part of the N resulting complex values are stored in the corresponding IOBuffer as the next N output values for that output channel.

Coefficient Loading To initialise the frequency domain coefficients in the BufMac structure from a time-domain impulse response it is necessary to divide the impulse response into M blocks of N coefficients, and with each block in turn:

Perform the upload function on the concatenation of the coefficient block padded to length 2N with zeros.

Compute the FFT of this result, observing that the scaling will be different than that used for processing potentially full-scale signals, if fixed-point processors are used.

Store data in BufMac structure, proceeding through the M blocks of coefficients.

Differential Memory Bandwidth Tolerant Segmented Impulse Response Frequency Domain Convolution Algorithm (New BufMac)

The new BufMac is significantly different from the simple expression of the corresponding stage of the original Low-Latency Convolution algorithm.

Part of this complexity is brought about by a desire to use the minimum on-chip memory possible (a requirement forced by available DSP processor chips). Most of the complexity is introduced by the need to use the DMA engine to transfer the data and coefficient values from off-chip memory to on-chip memory without having the processor introduce a pipeline stall for the wait-states, and from the need to use these values more than once, to keep the processor usefully busy.

The throughput constraint can be re-worded as "the processor is not waiting for slow memory while summing terms of the BufMac expression." Avoiding having to wait for memory is achieved in part by arranging to pre-fetch the coefficients and data required to compute a result for each frequency bin.

With a DMA engine, such as the one built into the Motorola DSP56300 series of DSPs, it is possible to perform this pre-fetch operation in parallel with a computation that is operating on a previously fetched block of coefficients and data. Alternatively, many modern microprocessors, such as the Intel Pentium-4 and Itanium have "prefetch" instructions that instruct the memory system to load values into the cache before they are needed as arguments of an instruction.

Consequently, the X and H values described in the following description do not refer directly to those values as stored off-chip in the BufMac data structure, but rather to on-chip copies that can be accessed without wait-states or pipeline stalls.

On its own, pre-fetching does not achieve the throughput goal, because it takes P times as long to fetch each block of data and coefficients from memory as it does to compute the corresponding result. The goal of the new algorithm in an embodiment of the invention, therefore, is to compute as many of the result values that will be needed in the P−1 succeeding frames as possible, given the existing data This is illustrated in FIG. 4, together with the relevant equations.

Figure 4:
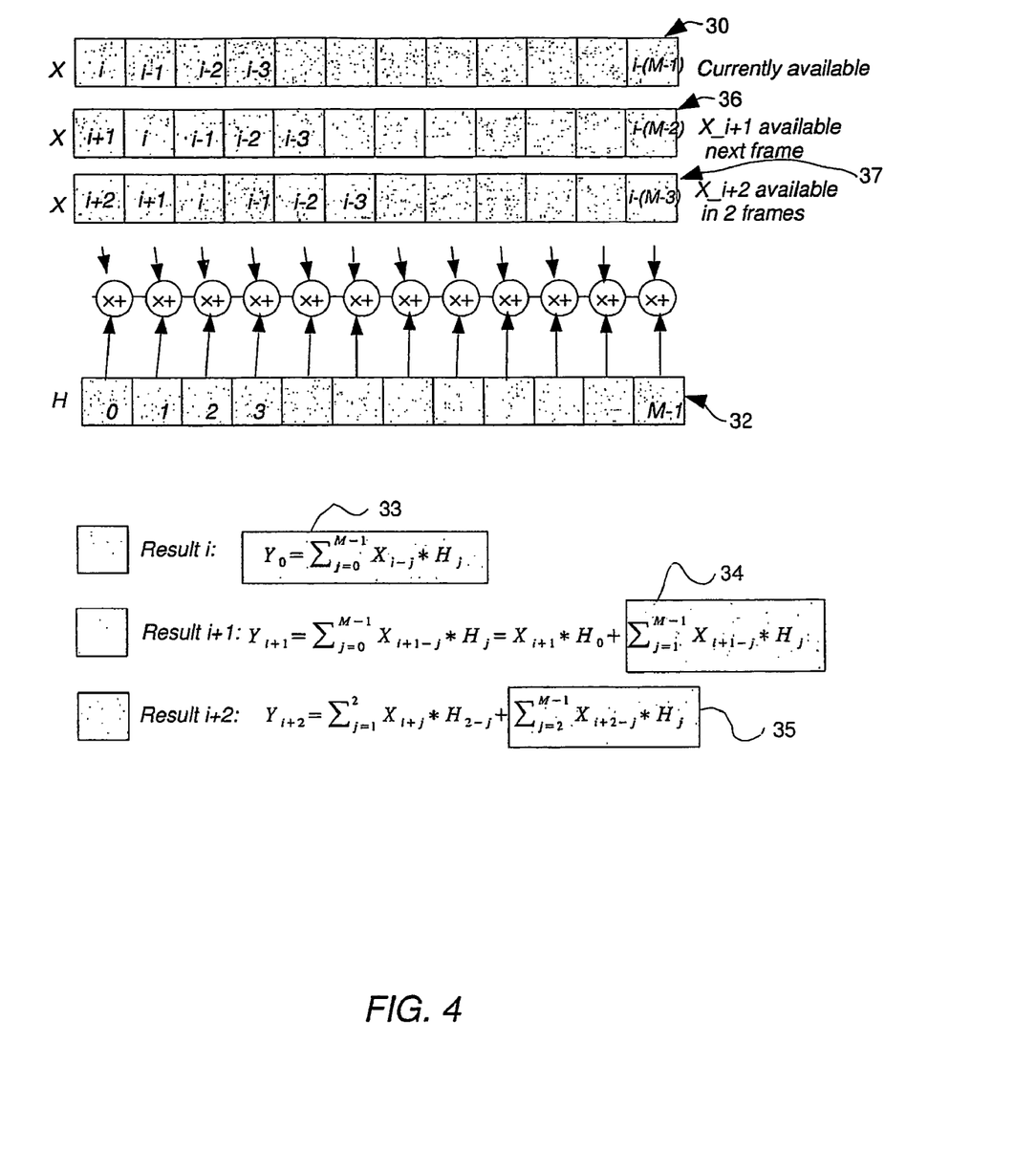
FIG. 4 illustrates the core computation of the BufMac loop and shows how partial results of future results can be computed with data available at a particular time (i) in an embodiment of the invention.

In FIG. 4, the currently available data 30 and the coefficients 32 are used to calculate results for a single frequency bin of the BufMac, that is result terms 33, 34, 35 can be computed with the data available in the current frame i, with terms 34, 35 being computed with the data available in frame i in anticipation of their use in frames i+1 and i+2 respectively. Also shown in FIG. 4 is the data available at frame i+1, 36, and i+2, 37.

It has also been recognised that one can make more use of the X values that we have loaded into on-chip memory by also computing results for multiple output signals, corresponding to multiple coefficient sets. It is a question of collocating the multiple coefficient sets with the corresponding data values so that a simple block transfer operation by the DMA/prefetch engine will bring all of the values in at once.

To complete the calculation of Y i ... Y{i+P−1}, in the succeeding frames, it is only necessary to compute the first term of the right hand side of the equations in FIG. 4 and add it to the partial result computed and stored by a previous calculation of equation 2 (computed when that data was first available). This part of the process is referred to as "the block update algorithm", and is now described in more detail.

The number of terms computed at the full processor speed will be $$MP - \frac{P(P-1)}{2}$$

and the number computed at the memory speed will be $$\frac{P(P-1)}{2}$$

Averaged over P frames, the number of processor cycles per frame consumed by the algorithm is $$\frac{(M + (P-1)(P-2))}{2}$$

whereas the direct implementation requires (P−1) M cycles, assuming that in this case accesses require only P−1=W+1 cycles, because without value re-use it is slower to use the DMA engine.

The algorithm requires M≧P, also its worst case behavior occurs when M=P, at which point the difference between the old and the new algorithms is $$\frac{(P^2 - P - 2)}{2}$$

cycles in favor of the new. (Note that this expression is zero when P=2, which corresponds to the zero-wait state case, for which the old algorithm is optimal).

This much of the new algorithm achieves the throughput goal, but requires that the processor have close to a factor of P excess capability, in order to reach the latency goal. That is because for one frame in P it must compute most of the result terms for P consecutive frames, and do comparatively little work in the intervening frames. This is still a useful result, because in computing most of the terms for all P frames at once we have increased the processor's efficiency by nearly that factor of P, and so the saved cycles are available for other work, if there is other work to be done.

Another way of looking at this state of affairs is to say that with this much of the algorithm, we still require a processor that can perform the original computation in real-time despite the presence of wait-states. What we have achieved is that it sits idle for nearly P−1 out of P frames of input.

In the next section we describe how to more evenly distribute the workload through time, so that the processing load is even or nearly even for each frame, with the result that we can still meet both the throughput goal and the latency goal with a processor that is much slower than the original, or (conversely) we can perform a computation that is nearly P times as large on the same hardware, compared to one using the original algorithm and memory with wait-states. The solution to this problem in a preferred embodiment is to apply the block-computation algorithm and the block-update algorithms to alternating groups of frequency bins, as is described below.

Leveling the Computational load while meeting the Latency Constraint

Figure 5:
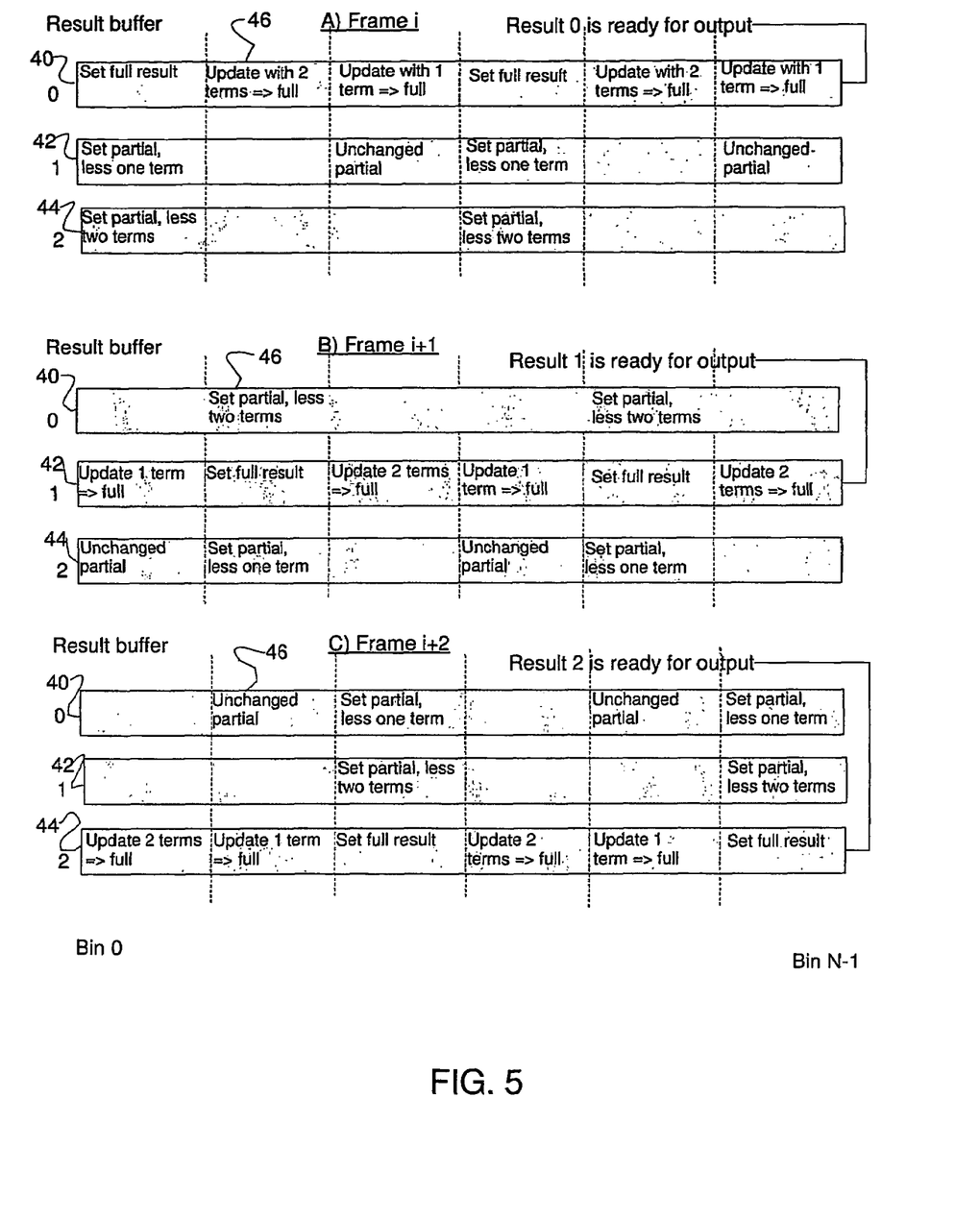
FIG. 5 illustrates the state of a result buffer for a number of different frames when utilizing the algorithm of one preferred embodiment.

As illustrated in FIG. 5, the computational load of pre-calculating the partial results for future frames can be shared across those frames by partitioning the set of frequency bins 40, 42, 44, and assigning a different schedule of algorithm execution to each partition e.g. 46, so that after P frames all of the partitions will have been processed by all stages of the algorithm. This implies that there is a P−1 frame start-up transient in which some result bins 40, 42, 44 will have an incorrect value, but after that a correct result will be present in every bin, for every frame. Consider the case where P=3 and $n_{OUT}$=2, as is shown in FIG. 4.

Here P is not a factor of N and so the partitions will vary slightly in size, some smaller than $$\frac{N}{P \cdot n_{OUT}} \left( \text{specifically floor } \frac{N}{P \cdot n_{OUT}} \right)$$

$$\text{some larger} \left( \text{specifically ceil } \frac{N}{P \cdot n_{OUT}} \text{ bins} \right).$$

bins). Care should be taken to ensure that the $P \cdot n_{OUT}$ simultaneously computed results for each bin can be efficiently updated, as this will be slightly larger than the FFT Buffer previously used by the algorithm. The number of partitions must be a multiple of P so that the complete sequence of computations can be performed without requiring dramatically different amounts of computation for each frame.

EXAMPLE ALTERNATIVES

1. When the specifics of the computer hardware make it difficult to enlarge the FFT Buffer to accommodate the extra results mentioned above, the number of frequency bin partitions can be increased, in multiples of P. This incurs a proportionally higher cost in terms of loop and subroutine call overheads, but that may be small compared to the cost of writing the results directly back to off-chip memory. For example, if P=3, and $n_{OUT}$=2, as above, but it is impossible to work on more than N result values at once, then the number of partitions must be at least nine. This will result in results filling approximately two-thirds of the FFTBuffer at the end of each partition.

2. The opposite limit to the size of a partition is also a useful working point: If each partition consists of a single frequency bin, then the different phases of the computation schedule are simply applied in sequence to successive bins. This simplifies the program logic, at the expense of some performance that might be lost because the next-to-inner loop is now more complicated. This problem can, in turn, be addressed by making each partition a small fixed number of bins, where the size of the partition is sufficient to satisfactorily amortize the loop startup overhead.

Schedule

To describe the processing schedule, consider that each of the iterations of the new algorithm are numbered, and the current frame number is i. Consider each of the frequency bin partitions to be numbered p∈[0, αP−1], for some cardinal α. In the examples that we have given above, has been $n_{OUT}$ (when we used six partitions), $n_{OUT}=1$ (when we used nine partitions) and $$\frac{N}{P}$$

(when we discussed using a partition size of one bin).

Then at each frame, the processing applied to partition p of the current result buffer is:

Full computation of current results for p (mod P)=i (mod P). That is:

$$\sum_{j=0}^{M-1} X_{i-j} \cdot H_j$$

Update existing results with the first i−p (mod P) terms from the previous equation otherwise.
That is result=result+

$$\sum_{j=1}^{k} X_{i+j} \cdot H_{k-j},$$

where k=p (mod P) followed by output of that current result buffer.

The processing applied to partition p of the result buffer for subsequent frame i>j for j∈[1, P−1] is:
Partial computation of the result using available data. That is $$\sum_{k=j}^{M-1} X_{i+j-k} \cdot H_k$$

when p (mod P)=i (mod P) and no change to the state of the result buffer otherwise.

The effect of this schedule (summarized in FIG. 5 when P=3 and $n_{out}=2$) is that each result bin will be computed in succeeding frames with the operations ["full", "update one term", ..., "update P−1 terms"] in the time frame that it is to be output. All of the results in a given partition will be computed to the same schedule, but the terms in the next partition will be computed according to a schedule that has been rotated forwards by one: ["update P−1 terms", "full", "update 1 term", ...]. After each of the results have been computed for each partition, the values can be stored in off-chip memory for subsequent processing steps.

In frames that a given result buffer will not be output, the only change made in that buffer is to the partition that is the same as the one receiving the "full" result in the current result buffer. In those partitions, the partial result computable with the available data is stored.

Figure 6:
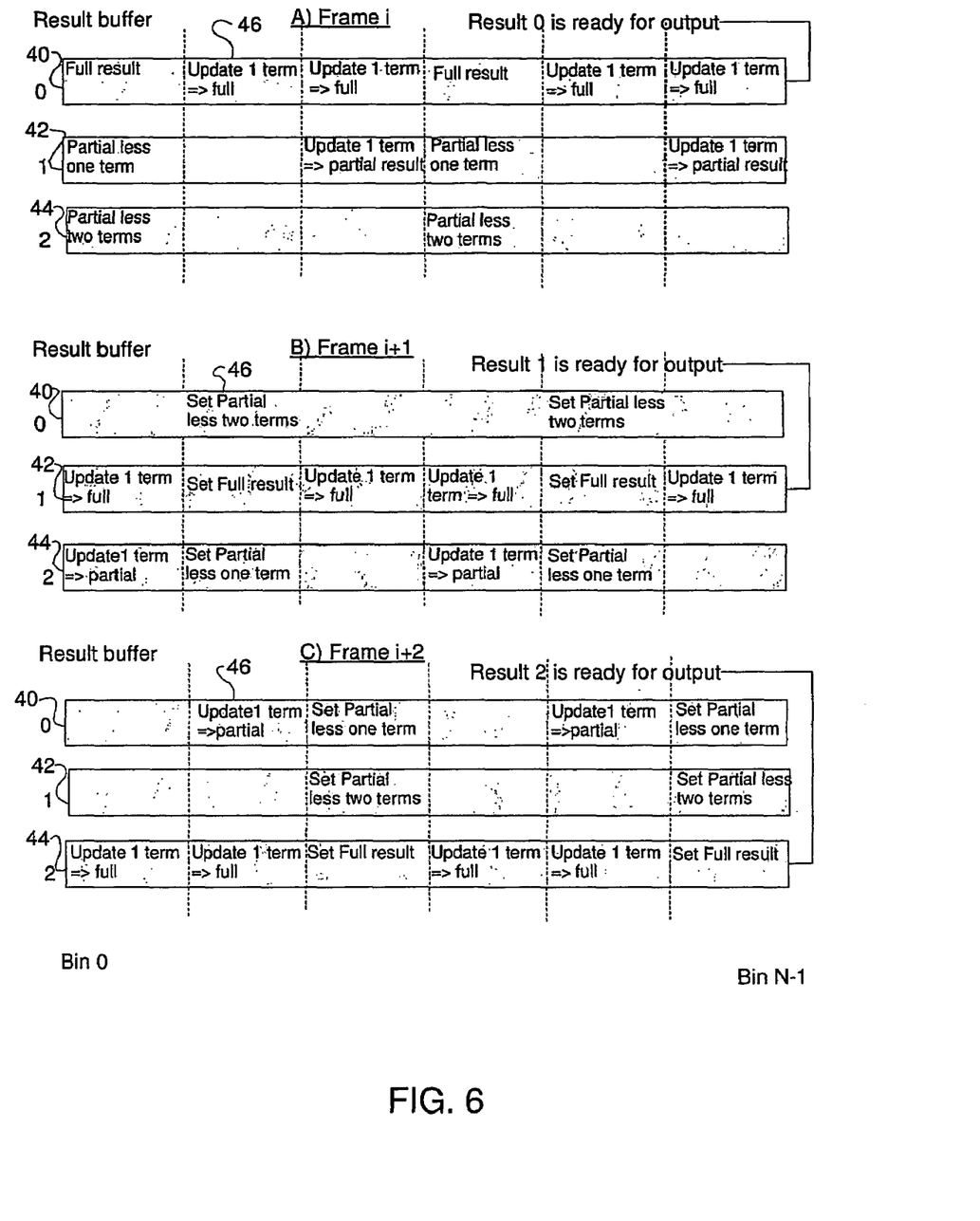
FIG. 6 illustrates the state of a result buffer for a number of different frames when utilizing the algorithm of another preferred embodiment.

FIG. 6 shows an alternative schedule, in which the multi-term update operations are spread over succeeding iterations of the schedule, so that each update operation only involves a single term operation with the single new data value.

Whether this arrangement is advantageous or not depends on the relative cost of accessing the other data and coefficient values at the time that the update is performed, compared to the cost of the extra read and write operations to perform the extra updates in the result buffer.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. For example, it will be appreciated that the results from different input sources may be accumulated into a single set of result buffers, for a multi-input configuration.

The invention claimed is:

1. A method of operating a processing apparatus to convolve input data representing time samples by a convolution function to generate data representing filtered time samples, for high speed, low latency computing using both local memory and non-local memory data accesses the processing apparatus including at least one processor and a local memory, the at least one processor capable of accessing a memory subsystem including the local memory, the convolution function partitioned into a plurality of smaller convolution functions represented in the frequency domain by a set of respective filters, the method comprising:

(a) retrieving at successive time frame blocks of the sampled input data, and converting the blocks of sampled input data into blocks of frequency domain inputs such that at a current time frame, the memory subsystem includes a current block of frequency domain inputs and one or more previous blocks of frequency domain inputs corresponding to one or more respective previous time frames, each block of frequency domain inputs including inputs at a set of frequency bins;

(b) computing as frequency domain outputs at the set of frequency bins the convolution of the sampled input data with the convolution function, wherein at a current time frame for each frequency bin, the frequency domain output is formed from the product of the current input and a first filter and one or more products of one or more previous inputs with one or more corresponding filters, such that each previous input has a corresponding filter for contributing to the present output, the computing comprising at the current time frame:

for a first set of one or more frequency bins, while a particular filter is in the local memory for the at least one frequency bin of the first set,
computing the product of a first input with the particular filter, the first input being the input corresponding to the particular filter for contributing to the current output, and
pre-computing the product of a second input with the particular filter that is the input corresponding to the particular filter in a first future time frame to contribute to the output at the first future time frame,
such that at the first future time frame, the product of the second input with the particular filter has been pre-computed for determining the output at the first future time frame for the first set of one or more frequency bins, wherein the frequency bins are partitioned into partitions of the frequency bins comprising at least the first set of one or more frequency bins and at least a second set a second set of one or more frequency bins different from the one or more bins of the first set, wherein at the current time frame, the method includes applying a first execution phase for the first set of one or more frequency bins, including the computing of the one or more products for contributing to the output at the current time frame, and the pre-computing the one or more products for contributing to the output at the first future time frame, wherein the method further comprises:

at the first future time frame for the first set of one or more frequency bins, applying a second execution phase comprising combining one or more products computed at the first future time frame with one or more products pre-computed before the first future time frame to form the output at the first future time frame for the first set of one or more frequency bins, at the first future time frame for the second set of one or more frequency bins, applying the first execution phase comprising computing one or more products for contributing to the output at the first future time frame; and pre-computing one or more products for contributing to the output at a second future time frame that is after the first future time frame, such at any time frame, different execution phases are carried out by the at least one processor on different sets of frequency bins in order to spread the work load of the at least one processor.

2. A method according to claim 1 wherein the computing of step (b) comprises at the current time frame combining one or more products computed in the current time frame with one or more products pre-computed during at least one preceding time frame.

3. A method according to claim 1, wherein computation of the output at the first future time frame requires at least one input which has not yet been retrieved 4. A method as claimed in claim 1, wherein each partition of the frequency bins has a different one of the execution phases applied to it from one time frame to another, and such that all execution phases needed to determine the convolution are applied to each partition before one of the execution phases is re-applied to that partition.

5. A method as claimed in claim 1, wherein the execution phases include a phase of determining all products to determine all outputs of the partition, and at least one phase of updating pre-computed results with-one product for the partition.

6. A method as claimed in claim 5, wherein the execution phases further include at least one phase of updating pre-computed results with multiple products of the partition.

7. An apparatus configured to accept input data representing time samples and to convolve the input data by a convolving function to generate data representing filtered time samples, for high speed, low latency computing using both local memory and non-local memory data accesses the convolution function partitioned into a plurality of smaller convolution functions represented in the frequency domain of frequency bins by a set of respective filters, the apparatus comprising:

a memory subsystem including a local memory;

a processor arranged, in use, to retrieve successive blocks of input data at successive time frames, to convert the blocks of input data to frequency domain inputs, and to compute at a current time frame as output in the frequency domain the convolution of a current block of input with the convolution function using the product of the frequency domain current input and a first filter and one or more products of one or more previous frequency domain inputs with one or more corresponding filters, such that each previous frequency domain input has a corresponding filter for contributing to the present output, wherein for a first set of one or more frequency bins, while a particular filter is in the local memory for the at least one frequency bin of the first set, the processor is arranged, in use:

to compute the product of a first input with the particular filter, the first input being the input corresponding to the particular filter for contributing to the current output, and to pre-compute-the product of a second input with the particular filter that is the input corresponding to the particular filter in a first future time frame to contribute to the output at the first future time frame, wherein the frequency bins are partitioned into partitions of the frequency bins comprising at least the first set of one or more frequency bins and at least a second set of one or more frequency bins different from the one or more bins of the first set, wherein the processor is arranged such that, in use, computing of output at the current time frame is broken up into different execution phases, and the processor is arranged, in use, at the current time frame, to apply a first execution phase of the phases for the first set of one or more frequency bins, including the computing of the one or more products for contributing to the output at the current time frame, and the pre-computing the one or more products for contributing to the output at the first future time frame, at the first future time frame for the first set of one or more frequency bins, to apply a second execution phase comprising combining one or more products computed at the first future time frame with one or more products pre-computed before the first future time frame to form the output at the first future time frame for the first set of one or more frequency bins, and at the first future time frame for the second set of one or more frequency bins, to apply the first execution phase comprising computing one or more products for contributing to the output at the first future time frame; and pre-computing one or more products for contributing to the output at a second future time frame that is after the first future time frame, such at any time frame, the processor is arranged to carry out different one of the execution phases on different sets of frequency bins in order to spread the work load of the processor.

8. An apparatus according to claim 7 in which the processor is arranged to combine at the current time frame one or more products computed in the current time frame with one or more products pre-computed during at least one preceding time frame.

9. An apparatus according to claim 7, wherein, computation of the output at the first future output time frame requires at least one input which has not yet been retrieved.

10. An apparatus as claimed in claim 7, wherein the processor is arranged, in use, such that each partition of the frequency bins has a different one of the execution phases applied to it from one time frame to another, and such that all execution phases needed to determine the convolution are applied to each partition before one of the execution phases is re-applied to that partition.

11. An apparatus as claimed in claim 7, wherein the execution phases further include at least one phase of updating pre-computed results with-multiple products of the partition.

12. An apparatus as claimed in claim 11, wherein the execution phases further include at least one phase of updating pre-computed results with multiple products of the partition.

13. An apparatus as claimed in claim 7, further comprising a chip, wherein the processor and the local memory are on-chip, wherein the memory subsystem further includes off chip memory, and wherein the memory subsystem is arranged to include a buffer for current outputs and a buffer for storing pre-computer products that are useable at a future time frame for determining future outputs.

14. A computer readable data storage medium having stored thereon instructions that when executed by a processing system, cause carrying out of a method of convolving input data representing time samples by a convolution function to generate data representing filtered time samples, for high speed, low latency computing using both local memory and non-local memory data accesses the convolution function partitioned into a plurality of smaller convolution functions represented in the frequency domain by a set of respective filters, the method comprising:
  (a) retrieving at successive time frames blocks of the sampled input data, and converting the blocks of sampled input data into blocks of frequency domain inputs such that at a current time frame, the memory subsystem includes a current block of frequency domain inputs and one or more previous blocks of frequency domain inputs corresponding to one or more respective previous time frames, each block of frequency domain inputs including inputs at a set of frequency bins;
  (b) computing as frequency domain outputs at the set of frequency bins the convolution of the sampled input data with the convolution function, wherein at a current time frame for each frequency bin, the frequency domain output is formed from the product of the current input and a first filter and one or more products of one or more previous inputs with one or more corresponding filters, such that each previous input has a corresponding filter for contributing to the present output, the computing comprising at the current time frame:
  for a first set of one or more frequency bins, while a particular filter is in the local memory for the at least one frequency bin of the first set,
    computing the product of a first input with the particular filter, the first input being the input corresponding to the particular filter for contributing to the current output, and
    pre-computing the product of a second input with the particular filter that is the input corresponding to the particular filter in a first future time frame to contribute to the output at the first future time frame,
  such that at the first future time frame, the product of the second input with the particular filter has been pre-computed for determining the output at the first future time frame for the first set of one or more frequency bins,
  wherein the frequency bins are partitioned into partitions of the frequency bins comprising at least the first set of one or more frequency bins and at least a second set a second set of one or more frequency bins different from the one or more bins of the first set,
  wherein at the current time frame, the method includes applying a first execution phase for the first set of one or more frequency bins, including the computing of the one or more products for contributing to the output at the current time frame, and the pre-computing the one or more products for contributing to the output at the first future time frame,
  wherein the method further comprises:
  at the first future time frame for the first set of one or more frequency bins, applying a second execution phase comprising combining one or more products computed at the first future time frame with one or more products pre-computed before the first future time frame to form the output at the first future time frame for the first set of one or more frequency bins,
  at the first future time frame for the second set of one or more frequency bins, applying the first execution phase comprising computing one or more products for contributing to the output at the first future time frame; and pre-computing one or more products for contributing to the output at a second future time frame that is after the first future time frame,
  such at any time frame, different execution phases are carried out on different sets of frequency bins.

15. An apparatus according to claim 7, arranged, in use, to execute a segmented impulse response frequency domain convolution algorithm computation.

16. A computer readable data storage medium according to claim 14, wherein each partition of the frequency bins has a different one of the execution phases applied to it from one time frame to another, and such that all execution phases needed to determine the convolution are applied to each partition before one of the execution phases is re-applied to that partition.

17. A computer readable data storage medium according to claim 14, wherein the execution phases include a phase of determining all products to determine all outputs of the partition, and at least one phase of updating pre-computed results with-one product for the partition.

18. A computer readable data storage medium as recited in claim 14, wherein the execution phases further include at least one phase of updating pre-computed results with-multiple products of the partition.

* * * * *